April 28, 1936.    L. H. BROWNE    2,038,983
AUTOMOBILE REVERSE MOVEMENT CONTROL
Filed Oct. 16, 1931    4 Sheets-Sheet 2
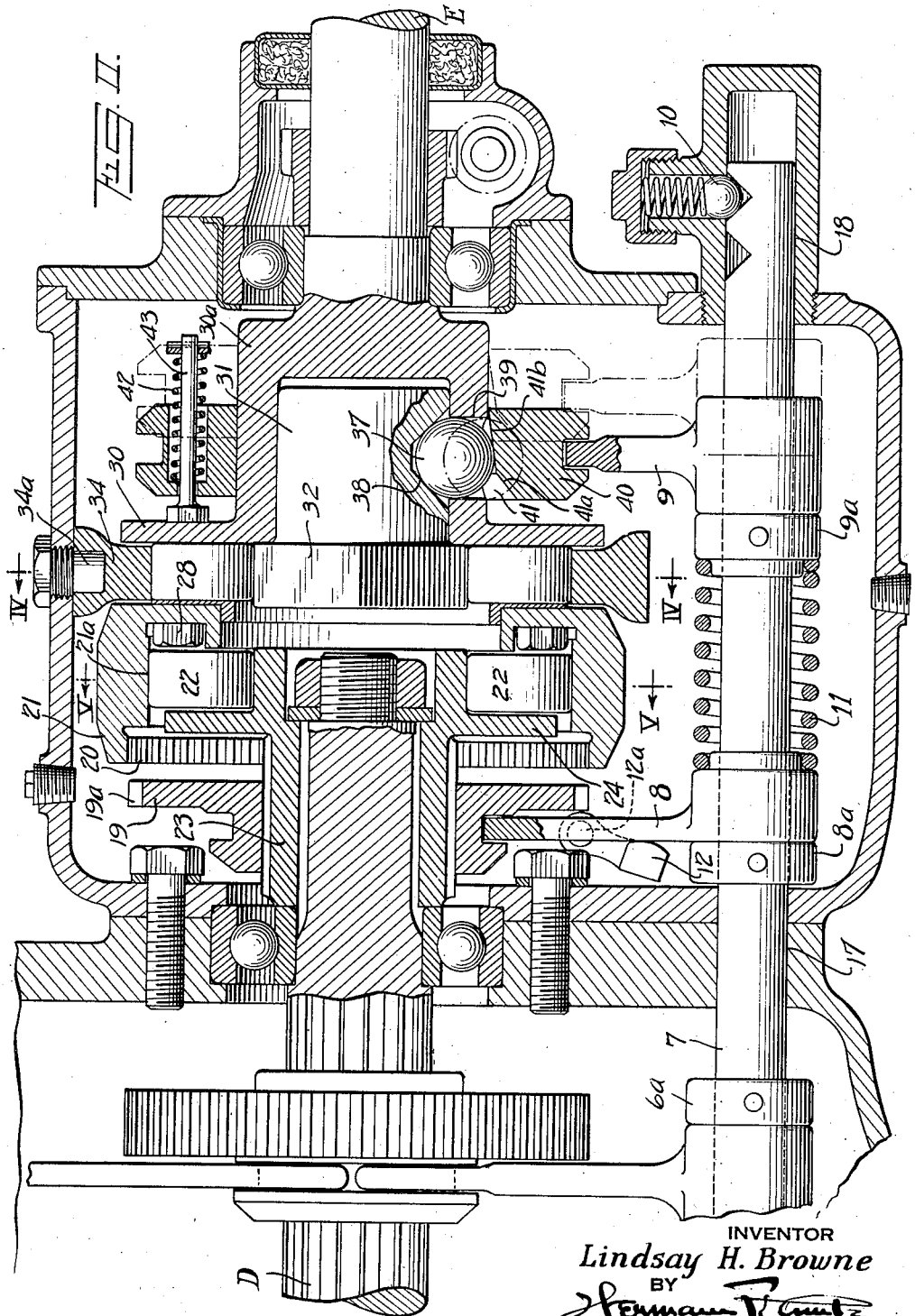
INVENTOR
Lindsay H. Browne
BY
his ATTORNEY April 28, 1936.  L. H. BROWNE  2,038,983
AUTOMOBILE REVERSE MOVEMENT CONTROL
Filed Oct. 16, 1931  4 Sheets-Sheet 3
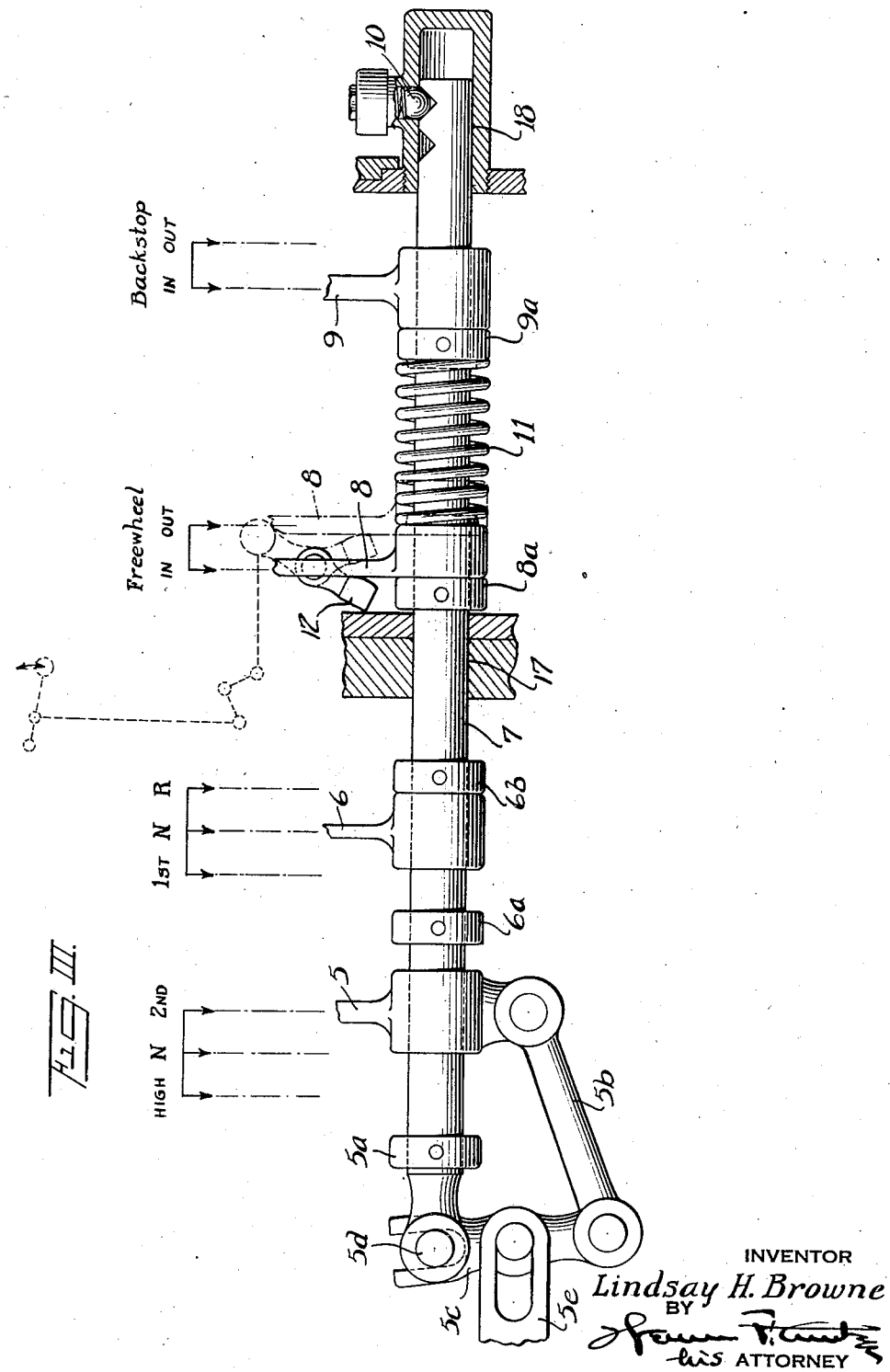
INVENTOR
Lindsay H. Browne
BY
his ATTORNEY

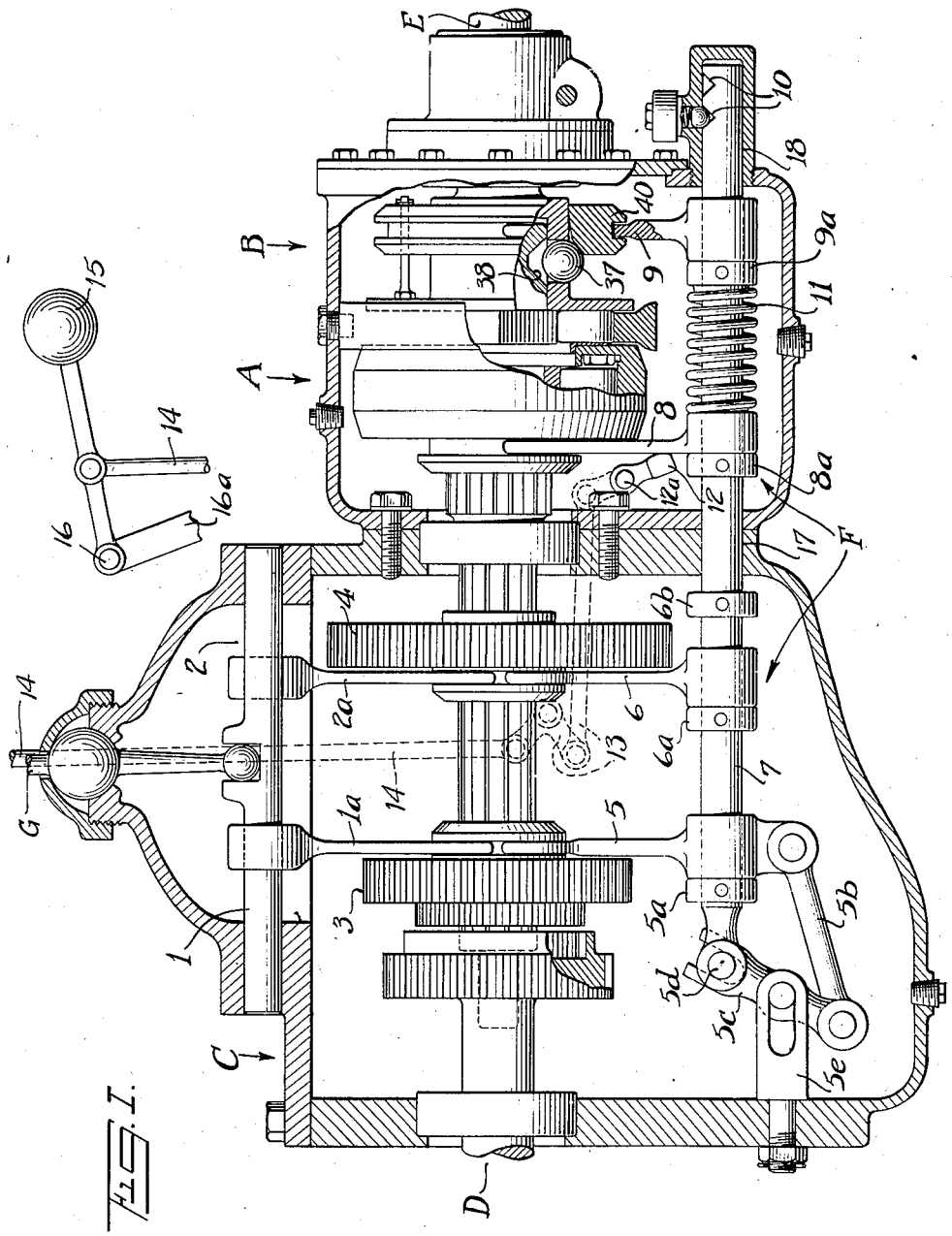

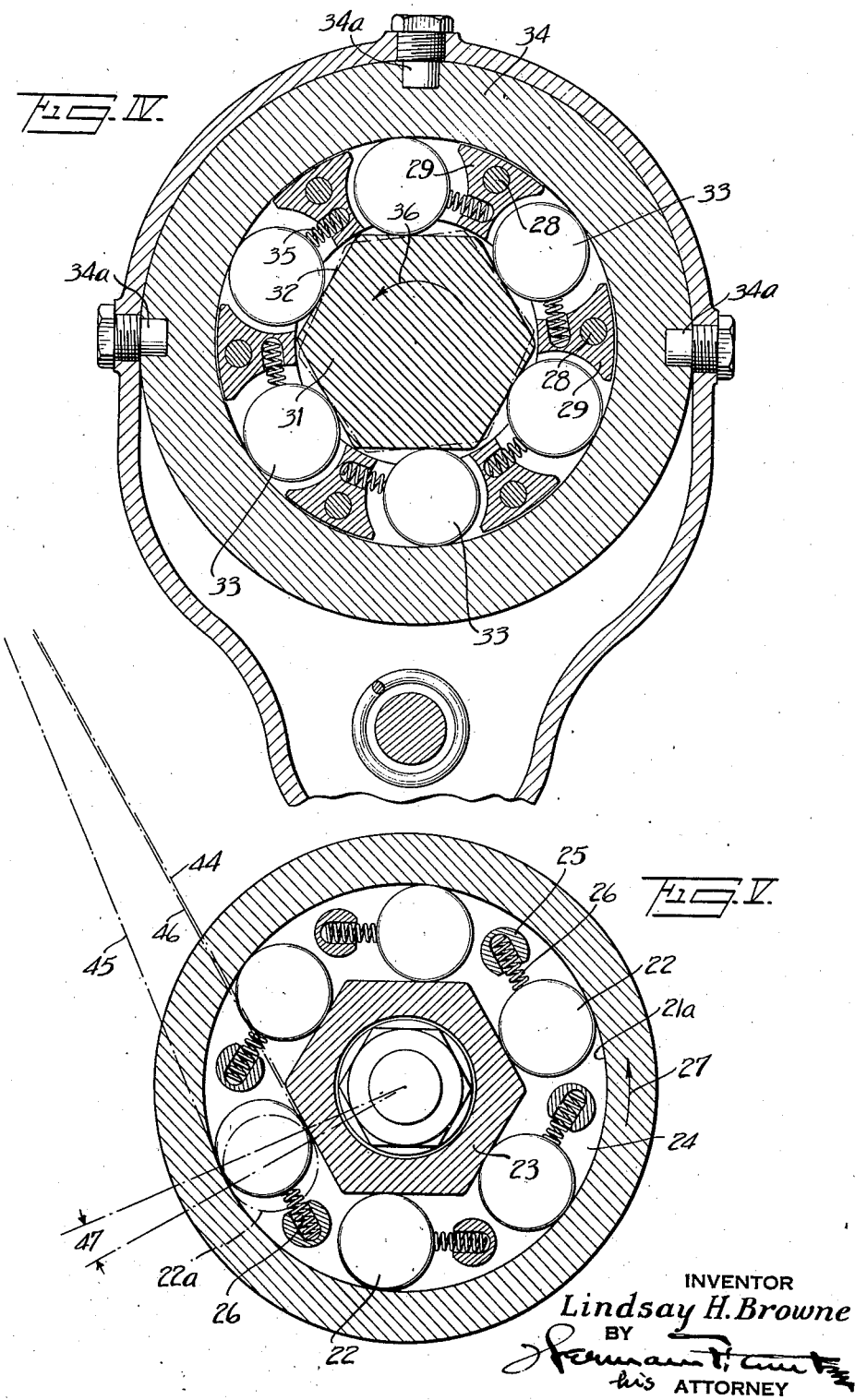

Patented Apr. 28, 1936

2,038,983

UNITED STATES PATENT OFFICE 2,038,983

AUTOMOBILE REVERSE MOVEMENT CONTROL

Lindsay H. Browne, Rochester, N. Y., assignor, by mesne assignments, to Josiah Anstice & Co. Inc., Rochester, N. Y., a corporation of New York Application October 16, 1931, Serial No. 569,159

18 Claims. (Cl. 192—4)

This invention relates to mechanism for the control of power transmission, and in particular the control of connections between the engine or power source in an automobile and the driven wheels, both as to the transmission of power and the interconnections regulating or affecting the relation of relative speeds between the final driven shaft or wheels and the shaft from the source of power, such as the usual engine.

These inventions in one of the preferred forms consist of a mechanism with coordinated parts and means of control part voluntary and part automatic, to provide in an automobile as a complete result what is now known as automatic free-wheeling and automatic back-rolling stop, as a combination under single unified control in an automobile. In the development of a construction which has solved the problem of a coordinated unit as to control and transmission functioning, for practical manufacture, reliability, simplicity and for practical embodiment with existing standard constructions in automobiles, the combination, as well as various features of the structure are practically usable in other connections, and as to such and as hereinafter claimed certain of the inventions herein are not limited to any specific use or application. As, for example, the back-rolling stop construction, as shown in all its detail in the accompanying drawings, is usable irrespective of other constructions or other features of the construction, or in combination with the control features illustrated that are solely applicable to the back-stop mechanism.

While I have herein shown and described the complete combination, the construction of the back-rolling stop and its various coordinated parts and arrangement have been made the subject-matter of the claims retained in this application. Other claims relating to the combination of back-rolling stop with free-wheeling, have been segregated and removed herefrom, and claims thereon will be made the subject-matter of a divisional application.

The application and use of my invention in an automobile, in any of its preferred forms, embody a unit, or in one sense a coordinated combination of two units, providing for the coasting or free-wheeling of an automobile, that is the over-running of the driven shaft due to a greater speed of rotation when the automobile is moving forward at a speed in excess of the speed of rotation transmitted by the engine, and in the same mechanism means for preventing an automobile from rolling backward when going up an incline, or any similar conditions, by automatically locking the driven shaft against reverse drive motion, and in this combination means of control or for setting the mechanism whereby all normal functions of power transmission, and car movement, are permitted and effected by a single control lever, and more particularly a control lever identical in operation by the driver of the car with the form or forms of control lever which heretofore have only served to shift gear ratios for a predetermined number of forward speeds, or reverse.

This invention will be more fully understood when considering that recently means have been provided for free-wheeling in different forms of construction and involving more or less complication in a transmission mechanism, or as an adjunct, and independently thereof there have been heretofore suggestions of means to prevent automobiles from rolling backward, which involved sprag bars or ratchets associated with the axles or wheels of vehicles, and some suggestions with respect to their combination with the driven shaft for power vehicles. But as herein shown in detail, in the accompanying drawings, the back-rolling stop and the control therefor, part voluntary and part automatic, provide for meeting practical operating conditions representing a substantial advance in the art compared with any constructions heretofore known to applicant.

The present invention involves the combination in a coordinated mechanism of means for the free-wheeling, back-rolling stop, and a means of control therefor that may be identical with the voluntary control lever operation for any standard transmission mechanism. Thus an ordinary gear shift lever set for forward driving at slow, intermediate and high speeds, accomplishes without any other action of the driver, the simultaneous setting of the mechanism so that it will automatically function for free-wheeling. When the single standard normal gear shift lever is moved to set the transmission into reverse drive, it automatically sets the mechanism to prevent free-wheeling, and simultaneously automatically sets the mechanism to prevent the functioning of the back-rolling stop operation. When moving the single control lever out of reverse position to neutral it leaves the mechanism with neither the back-rolling or the free-wheeling capable of functioning, but assures a positive through drive, from a normal condition of positive control of the vehicle as if the entire mechanism were not embodied. Shifting the transmission control lever to the slow forward speed, or any other forward speed simultaneously or automatically sets the back-rolling mechanism for automatically functioning, and should the car then start on an upgrade it will automatically be prevented from back-rolling, and in fact will be locked against back-rolling, but should the operator for any reason desire to then shift his gears into reverse, the mechanism is such that the operator's voluntary action instantly and readily releases the back-stop, puts the reverse drive control into normal functioning. It may also, and automatically, negative the free-wheeling functioning of the device. Should the transmission lever be in position setting the reverse drive condition, the lever may be shifted into neutral position without affecting any change of the mechanism, that is it will still keep the automatic back-rolling means out of functioning, and will also keep the free-wheeling mechanism out of functioning position, thereby permitting the car to be manipulated normally, namely, to be rolled forward or backward as desired. When having once shifted the gear change transmission lever, or a single lever provided in this combination for the purpose, so that forward drive at any of the predetermined speed ratios is set, the back-rolling mechanism is automatically set on forward car-rolling to automatically function.

As to the free-wheeling the mechanism is susceptible of two conditions as may be desired, namely, in the preferred form a separate voluntarily operated rod or lever accessible to the driver may be pulled or shifted, and instantly throws the free-wheeling mechanism in a condition to automatically function so long as forward drive of power continues,—or the mechanism may be so arranged that with the setting of forward speeds the free-wheeling is simultaneously prevented from automatically functioning. By this combination the definite position of the free-wheeling mechanism is positively under the control of the operator so that he may set the mechanism to function automatically, or may voluntarily at any time of forward drive, make an independent voluntary, movement to negative the functioning of the free-wheeling.

It will be understood that besides simplicity, compactness and the proper coordination of the mechanism, it is essential that the operator shall at all times be able to assure positive control of the car. He may wish to use his motor for retarding or braking purposes; he may have to release his automatic back-rolling lock quickly or instantly, to meet desired or emergency condition of operation; the mechanism must function in a fool-proof manner so that no forgotten movement by the operator, or forced movement by the operator will cause a setting or automatic condition of functioning that would leave the car out of positive control by the operator. Such features result from the construction as shown in the accompanying drawings in which, for example, the back-rolling couple or mechanism may be readily and definitely forced out of functioning when desired, and the back-locking functioning will not or need not become operative, that is would not automatically become set, subject only to the desired conditions of operation of the vehicle. For example, it will be seen that for any particular car the mechanism which automatically sets the back-rolling lock will not start to function until or unless the car starts to roll forward, or until at least a slight forward drive torque from the engine effects a slight rotative movement of the shaft connections in a forward direction.

All of these conditions are met in forms of the invention herein shown or described to provide essentially and particularly advantages of free-wheeling or back-rolling control in an automobile. Some of the features or combinations may give the comparable advantageous results in other applications where suitably combined or adapted.

A particular embodiment of my invention for use in self-propelled vehicles will now be described with respect to a form or design shown in the accompanying drawings, in which:

Fig. I is an elevation in arbitrary vertical section, part fragmentary, generally on the axis of the transmission shaft in an automobile showing the coordinated parts of gear shift control and free-wheeling and locking control mechanism.

Fig. II is a section in part fragmentary, on the axis of the combined free-wheeling and automatic back-stop mechanism, on a larger scale.

Fig. III is a side elevation, part section, of the combined control means for gear shift, free-wheeling and back-stop mechanism, on a larger scale.

Fig. IV is a cross-section in the plane IV—IV of Fig. II, showing on a still larger scale the back-rolling, clutching or stop mechanism.

Fig. V is a transverse section in the plane V—V, Fig. II, of the main parts of the free-wheeling mechanism, on the same scale as Fig. IV.

In the particular embodiment of my invention herein illustrated, there is shown in Fig. I the combined free-wheeling couple A and back-stop couple B in a housing attached to the housing of a slide gear transmission C, in which typical cooperating parts are shown. A single casing will house all of these three parts in still more compact form, in cases of adapting the entire combination and its controlling means for standard construction. As shown, the housing for couples A or B is particularly suited to attach to the end of transmission housing in or substantially in their present form, with such modifications as will hereinafter appear for coordinated and interlocking control.

Shaft D is driven from the engine, and E is the driven shaft such as the propeller shaft extending to the worm or gear drive at the differential of the rear axle. The inter-control means F provides for the proper coordinated shifting of the couples A and B and the change gear shifting, and it will be noted in the form shown that the single means, such as the ordinary gear shift lever G, by its regular or standard movements of gear shifting, for forward or reverse, automatically effects the desired changes in the setting of the control of the free-wheeling and back-stop couples A and B.

For the purpose of illustration only essential elements as gears and parts, of a typical sliding gear transmission are shown, as the construction within the gear box may be varied in many respects. For the purpose of the coordinated structure involved in this application, the gear change lever G engages in the usual manner a shifter-bar 1 or the shifter-bar 2, each having the shifting fork 1ᵃ or 2ᵃ with its usual engagement to shift the gear couples 3 or 4. The fork grooves also accommodate forks 5—6 which are carried on a shifter-bar 7 and adapted to longitudinally move shifter-bar 7 which extends parallel to the main drive shaft and parallel to the axis of the free-wheeling and back stop couples A and B. This shifter-bar 7 has fork 8 engaging the hub of the free-wheeling couple member and a second fork 9 engaging a groove on the back-stop couple member. The shifter-bar 7 thus provides the interconnection, and for operation it is supported and adapted to move longitudinally a predetermined short distance and held in either one of two positions by the spring-pressed ball and notches 10. The movement of this shifter-bar 7 is effected by the hub of the fork 5 engaging the collars 5ª, or by movement in the opposite direction pulling the link 5ᵇ to shift the lever 5ᶜ with its fork engaging the pin 5ᵈ on the end of the shifter-bar 7,—so that movement of the fork 5 in either direction shifts the bar 7 only in one direction, and thereby moves the collars 8ª and 9ª so that the forks 8 and 9 may shift to respectively cause functioning of the free-wheeling and the back-stop couples, as more fully described with respect to Fig. III. With the shifting of fork 6 in one direction it moves the collar 6ª, and shifting in the opposite direction thereafter moves the collar 6ᵇ, the latter movement causing the shifter-bar through the collars 8ª, 9ª to shift the forks, 8, 9 of the couples A and B, so that upon reverse drive setting of the shift gears the free-wheeling is positively cut out, and the back-stop couple is positively cut out, that is prevented from functioning as a back-rolling brake. As at times it is desired to prevent the free-wheeling from functioning, the spring 11 is used to throw the fork 8 when permitted by the movement of the collar 8ª with the bar 7, so that a stop-lug 12 may be set to positively prevent movement of the fork 8 against action of the spring 11, and this means of negativing the throwing "in" of the free-wheeling couple may be voluntarily or otherwise provided for, while in the present embodiment I have shown in dotted lines the linkage 13—14 which serves to actuate the stop-lug 12 through oscillating a shaft 12ª extending to the side of the housing or supported in any suitable manner, the rocking of which is thus effected by the movement of the rod 14, the upper extension of which is shown fragmentary beside Fig. I, indicating the lever or button 15 adapted to be pushed down or pulled up about the fixed pivot 16 on a suitable fixed member 16ª subject to definite voluntary control. The arrangement in this form brings the free-wheeling cut-out control adjacent the gear shift lever, in order that the instinctive movements of a driver in handling a gear shift lever will lead to readily noting and readily manipulating by the same hand the means for throwing "in" or throwing "out" of the free-wheeling couple.

As shown in Fig. III, the control shifter-bar 7, interconnecting the transmission and the free-wheel and back-stop couple controls is shown in a position in which the transmission has been shifted to second forward speed, so that fork 5 through links 5ᵇ, 5ᶜ and its forked end has shifted the pin 5ᵈ by engagement with the end of the slot in the fixed support 5ᵉ mounted on the housing, and supporting the rocker pivot of the link 5ᶜ. The slot in this fixed support permits the pivot of the rocker link 5ᶜ to shift when fork 5 is moved into neutral or high gear position, without affecting any movement of the shifter-bar 7. As shown in this figure the bar 7 has been moved to the left, thereby moving collars 8ª and 9ª so that the spring 11 due to its initial compression forces the hub of the fork 8, and thereby shifts the sliding member of the free-wheeling couple into the "in" position, namely, setting the free-wheeling couple for functioning. In this position the stop-lug 12 has been moved by the linkage under control of the driver, so that it does not interfere with the automatic functioning of the control effected by the shifter-bar 7. Simultaneously the movement of the collar 9ª permits the movement of the fork 9 to the "in" position of the back-stop couple, and the rotating grooved member or floating ring controlled by this fork 9 then is free of the shifter-bar control and may shift into the back-stop functioning position in view of the spring control of the members of the couple, and cooperation of the interengaging parts of the couple, as more particularly described hereafter.

In Fig. III the various positions of gear shift controlled forks, and the free-wheel and back-stop forks are clearly indicated, and from this it will be seen that when fork 5 is shifted by a change from second to neutral there is no positive movement imparted to the shifter-bar 7 which is held by the positioning spring-ball and notch 10 without change, and shifting the transmission to high speed also causes no engagement by the hub of the fork 5, so that no change takes place, and with high speed the free-wheeling and back-stop functioning remains effective. It will be seen that if fork 5 is in neutral and fork 6 moved into first speed position, it engages no collar and does not disturb the longitudinal position of the shifter-bar 7,—but on the contrary when shifter-bar 6 is moved into reverse position it immediately throws the shifter-bar to the right and positively cuts out the back-stop functioning, and likewise cuts out the free-wheeling functioning, so that as soon as the reverse speed is set, while the main driving clutch is open, the entire transmission will be ready to let in the driving clutch for the reverse or rearward driving of the car. When desired the action of setting the transmission into reverse may be so timed as to throw out the reverse or back-rolling stop couple in advance of any engagement of the main clutch while the reverse gear drive is in mesh, which, however, is unnecessary in any ordinary manipulation of a car.

The position of the shifter-bar 7 shown in Figure I, is held by the positioning spring-ball pin with both free-wheel or back-stop couples "out", as would be the case with transmission gear forks 5—6 both in neutral position, and a condition which has been effected by having thrown the fork back to neutral, under which condition both of the supplementary couples A and B, are intended to remain out of action. As there shown the voluntary means for negativing the movement of the free-wheeling fork 8 is also set so that free-wheeling is prevented unless specifically desired by the operator and effected by a positive movement of the control-button or knob 15. The shifter-bar is supported in bearing 17 at the junction of the housings, or in any suitable member in a single unified housing, and at its rear end in a bearing 18 which readily provides for capping the end and protecting the positioning ball, though various other supports may be provided in order that positive control for the limited longitudinal shifting of this bar may be accommodated and its constant desired functioning assured by proper oiling within the housing.

The free-wheeling and back-stop couples A and B will be more fully understood with reference to Fig. II, in which the shifter-bar 7 actuates the fork 8 which engages the annular groove in the sliding member 19, having peripheral teeth 19ᵃ adapted to engage and lock as a clutch with the internal teeth 20 on the member 21 constituting an outer clutching member, with the face 21ᵃ engaging the rollers 22, as shown in section Fig. V, which rollers also engage the hexagonal faced hub 23 which is splined and locked to the drive shaft D extension from the transmission. The hexagonal faces on 23 have an adjacent flange 24 on which studs or abutments 25 are carried and support springs 26, pressing the rollers 22 in one direction,—so that when the clutch teeth 19ᵃ are not in mesh with the internal teeth 20, the member 21 can over-run the hub 23 when moving in the direction shown by the arrow 27 in Fig. V, because the rollers will move as shown in the dot and dash line 22ᵃ by a slight compression of the springs 26, thus preventing any locking between the rollers and the surface 21ᵃ and the hexagonal surface of the hub. On the contrary, when the relative movement is in the opposite direction the springs cause the rollers 22 to take their locking position, and thereby provide for a positive clutching when the engine is driving the shaft D faster than the movement of the parts due to the rolling of the vehicle by its momentum or inertia.

The drive connection from the free-wheeling ring 21, to the final driven shaft E is caused by the bolting together of ring 21 by bolts 28 through the segments 29 forming a part of the flange 30, which is a part of the stub shaft 30ᵃ or an integral portion of the end of the driven shaft E. Within this stub shaft 30ᵃ is a close fitting but rotarily slightly movable nested stub shaft 31, having hexagonal faces 32 and engaging each face a roller 33 adapted to lock the face with an outer locking ring 34, which is a fixed or stationary ring suitably anchored to the housing to withstand the strain of resisting the back-rolling tendency of the shaft E, subject to the effect of the weight of the car tending to roll backward on an incline. This fixed ring may be lugged into the housing as by studs 34ᵃ, or otherwise supported with a large frictional contact with the inside of the housing, to give it the desired rigidity. The coacting of the fixed ring with rollers 33 and the hexagonal faces 31ᵃ on the hub 31 depends upon the relative position of the rollers with respect to the angular position of the locking faces 32, and this is effected by having each roller spring-pressed in one direction by the springs 35 mounted in the abutments 29, rigidly supported with respect to the flange 30 and the drive ring 21, and then providing for a limited relative rotary movement of the stub shaft 31 with respect to the shaft 30ᵃ forming the end of the driven shaft E, so that as shown in Fig. IV the locking will be effective when the hexagonal faces 32 are as shown, as in the full line position, and the locking will be ineffective when the hub 31 and the hexagonal faces 32 are slightly displaced rotarily, as indicated by the arrow 36, into the dot-and-dash position, because in such position the space between the hexagonal faces and the inner surface of the fixed ring 34 will be greater than the diameter of the rollers 33, in the position in which the rollers are then pressed by the springs 35, namely, to a limited position fixed by their contact with the face of the abutments or spacers 29 rotating with the flange 30 and the ring 21. Thus in the latter position, effective in reverse drive of a car, the power transmitting shaft drive will be free to rotate in the reverse direction.

The functioning and control of the back-stop couple, positive for release and automatic for setting, will be understood from the accompanying drawings showing one form in which the setting of the hexagonal faced hub 31 is accomplished by a series of balls of which one is shown at 37, each ball arranged to engage an individual recess 38 in the stub shaft 31, and simultaneously to engage the walls of a recess or hole 39 in the stub shaft 30ᵃ. In such engaging position, shown in Fig. II, the relative position of recesses is such that the positive ball-engagement, that is when forced radially inward, locks the hub of locking stub 31 in the position rotarily as shown in full lines in Fig. IV, namely, to functioning as a clutch to prevent back-rolling. When such functioning of back-stop couple B is not desired, the balls 37 are released from their locking position by the lateral retraction of the shifting or floating sleeve 40, which has a recess 41 cut in its internal face adjacent each of the balls 37, a portion 41ᵃ of which recess for first engagement with the balls is at an angle of approximately 45 degrees, in order to easily engage with a predetermined limited reaction, while the remaining internal face 41ᵇ of the recess 41 is formed at an angle of about 10 degrees, in order to provide the required reaction to force the balls radially inward with a positive locking grip between the stub-shaft 31 and the end 30ᵃ of the driven shaft. This floating ring 40, as shown in Fig. I, has released the balls so as to permit the relative slight rotary movement of the hub of clamping stub 31, while in the position shown in Fig. II the balls are shown in fixed position, and this is effected in the embodiment illustrated by the lateral movement of the floating ring 40 by a plurality of springs 42 supported in recesses of the ring and carried by studs 43 mounted on flange 30, the springs functioning when they over-balance the reaction to radial movement of the balls due to the interrelation of the other parts.

In this manner the movement of the fork 9 by the shifting of the bar 7, positively retracts the floating ring 40, so that the balls 37 are free to move radially outward, and due to centrifugal force as well as the non-locking and unlocking or release from the pressure of the riding-face 41ᵇ on the floating ring, the hub or locking stub 31 freely floats into a non-locking position of its hexagonal faces 31ᵃ. When, however, the control bar or rod 7 is moved so that collar 9ᵃ recedes from the hub of the fork 9, then the springs 42 tend to cause the lateral movement of the floating ring 40, and with the engagement of the inner faces adjacent the balls 37 the positive interlocking of the member 31 with stub shaft 30ᵃ is immediately effected, when the riding-face 41ᵇ on floating ring 40 exerts sufficient pressure under the influence of the springs to overcome the forces holding the hexagonal faces 32 in an unlocked position in relation to the abutments 29. It will be seen, in Fig. IV, that when the hexagonal face-head 32 is in unlocked position, the rollers 33 will be forced by the springs 35 against the abutments 29, and in that position do not lock but serve to hold the position of the hexagonal head in the unlocked position, and thereby prevent the hub 31 of the hexagonal head from turning into a position that would permit the balls 37 to be seated in the bottom of the recesses 38. The tapered walls of such recesses, as shown, establish a predetermined reaction against radial movement of the balls, when the recesses or counterbores 38 are rotarily displaced by the displacement of the hexagonal head 32 with respect to the abutments 29. The abutments 29 being rigidly associated with the driven shaft E and directly or indirectly with the drive shaft D, must therefore move slightly with respect to the hexagonal locking-head 32 in order that the recesses 38 reach a position with respect to the hole 39 in the shaft sleeve 30ᵃ, before the force due to the springs is sufficient, with the predetermined angle of the riding-face 41ᵇ, to positively force the balls into the position which locks the hexagonal head and its stub-shaft for functioning as a back-rolling lock. Therefore, when in "off" position, the back-rolling lock will not resume its locking position until the driven shaft E or the drive shaft D have rotated slightly with respect to the abutments, and that movement is either a slight forward rolling of the car or the forward drive of the shaft D as by letting in the clutch to transmit the power of the engine. Thus, when the gear shifting-lever moves the shifter-bar 7 to throw out the floating ring 40 and prevent locking, the ring stays out even though the shifter-bar is moved to neutral position, or to any forward position setting the gears for forward drive,—so long as there is no actual movement imparted in a forward direction to the driving or driven shafts.

The relative positions of the hexagonal locking members either for the free-wheeling or the back-locking, are most practical in the form and relative dimensions as approximately shown in Figs. IV and V, though other polygonal faced members may be used suitably designed therefor. As shown in Fig. V, it will be seen that the changed position of the face engaging one of the rollers, in the case of the free-wheeling clutch, effect a positive locking between the surfaces, as indicated by line 44 and the tangent 45 of the inner surface of the ring, whereas with the over-running action driving the rollers against the springs 26, the rollers' periphery in the line 46 is freed from locking contact with the face of the hexagonal member when the roller moves to the position 22ᵃ,—and this relative movement of each roller is indicated by the angle 47, thus indicating the very small relative angular movement required to cause the hexagonal face roller-clutch to lock or disengage completely. This slight angular movement in the case of the back-stop mechanism is admirably accomplished by the radial retraction of the balls 37, and thereby provide for a most satisfactory functioning of these clutch members.

This retraction of the balls 37 occurs when the floating ring 40 is forcibly moved by the fork 9 moving any suitable floating ring having the suitable bearing on riding surface in engagement with the balls, at such an angle that a quick release is provided, and in the reverse operation the angle is such as to cause a reaction on the balls necessary to lock the balls, and thereby force the stub-shaft 31 and the hexagonal head into its functioning position. The inter-relation of these parts is such that with a light weight automobile or a heavy truck, the respective conditions are met by suitable variations of angles and spring strength, to assure the automatic action desired to set back-stop conditions, and likewise the relation of parts is such that when voluntarily desired the functioning of the back-lock can be under all circumstances released,—by the positive shifting of floating ring 40, or its equivalent. On this account a condition is possible that does not exist with any prior devices of this character, namely, when a motor car has reached a position preventing any forward movement of the car, with the back-lock mechanism set, it still is within the voluntary control of the operator to release the back-stop mechanism and permit the rearward driving of the car, to extricate it by rearward drive. All of the particular advantages involved in the back-stop or back-rolling mechanism or couple are of particular advantage alone, and irrespective of their combination with the free-wheeling or other construction. When the back-stop mechanism involving any or all of my inventions, is combined with the ordinary transmission actuation, the results are as hereinbefore described and function as illustrated, providing in its preferred form an essentially fool-proof control mechanism. With its interconnection with the control mechanism it accomplishes the various results not heretofore attainable, and which meet the various essential conditions of practical operation of a motor car.

With particular reference to the functioning of the roll back stop, the certainty of actuating either when automatically preventing back roll, or when the device is set to prevent such action, is assured irrespective of wear and irrespective of friction. Thus it will be seen that the cam ring or cam member is either in or out, with relation to the other members as to its functioning position, and also that it is positively set in its "on" or "off" position irrespective of wear. In fact, any wear that might occur is automatically compensated, because for the in functioning position the balls are always forced into positive holding position because the floating ring moves as far as necessary to drive them home on their countersunk tapered seats, automatically taking up any wear, in fact compensating for any slight irregularities which means wider tolerances in manufacture. The three-ball arrangement still further assures this.

For the out-of-functioning position the cam ring moves relatively to the abutments so that it always reaches a position positively precluding locking of the rollers irrespective of wear, in fact any possible wear on rollers or cam surfaces can only tend to more positively assure perfectly free out-of-functioning position, and still the construction assures ample relative movement to take the locking position for all cam faces each with its roller pressed by its spring so that each roller is sure to take its locking position—irrespective of wear, and self-adjusting or compensating for wear.

While such functioning is evident from the accompanying drawings, it will likewise be noted that these features and the advantages thereby attained would apply to various modifications of the construction from the particular embodiment herein shown and described. Such modifications may be in many respects such as material, dimensions, reversal of parts, the connections of the back roll stop with the other parts of the automobile and as to its relation to the driving or driven shafts, whether independent of or included in the housing associated with any of said shafts, or otherwise.

Having thus described all of the details of construction of a particular embodiment of my invention in the form illustrated herewith, it will be noted that when such structure is embodied in an automobile, the driver utilizes or controls the mechanisms involved by solely operating the gear shift lever G. The driver's operation is the normal operation of the gear shift lever and by the interconnections that single lever with which every car operator is familiar, effects all of the advantageous functions, properly interlocked and foolproof, of free-wheeling and back-rolling stop, properly interdependent with the change speed mechanism. However, he is also given one additional voluntary operation, namely, by the button or knob 15 by which at will he can negative the free-wheeling under conditions he might desire.

The control of the mechanism either all automatic interlocking, or part voluntary, I prefer to have subject to the driver's control in a manner that gives him at all times evidence of the condition of the supplementary couples, and in particular to keep the driver constantly warned of the fact when the free-wheeling is set in functioning position, and to provide for quick and positive negativing of the free-wheeling, in order that whenever desired the coupling of the transmission shaft, that is positive connection between the engine and the driven wheels can be assured for the purpose of using the retarding effect of the engine when going down hill, at any time desired.

It will be understood that for purposes of illustration, the shift gear transmission typical elements have been shown, but the general practice involves the usual clutch between the engine and the transmission, released in the usual way for changes of the gear ratios; also that speed control by the throttle is effected, and will be manipulated in conjunction with the free-rolling speed of the car when it is desired to bring the engine speed in unison with, or exceeding the speed due to the momentum or gravity. These and various other features of coordination in the practical use of my inventions will be evident to one skilled in the art.

I have therefore illustrated only essential parts for the interlocking functioning between the transmission, free-wheeling and back-stop couples, in the accompanying drawings.

It will be noted, however, that in my preferred form the back-locking and free-wheeling couple are placed to the rear of the transmission, so that no load or strain due to braking or locking against back-rolling is transmitted to the gear shifting system. While preferably adjacent the change speed housing or embodied with it, the additional mechanism comprising these couples may be adapted to existing cars, but beyond the transmission and in front of the rear axle drive, the adaptation may be variable depending upon the details of existing constructions. But the constructions involving my inventions are preferably combined in the production of new transmission construction, and may be in part or whole within the same casing as the gear shift or other mechanism, or may in part be an added structure prefabricated to be combined with the otherwise standard mechanism, and in particular the back-rolling lock construction in such manner may be added, or may be a permanent part of the gear-shift or speed-control mechanism. While I have shown this preferably between the gear change system and the driven axle, I prefer in particular that the back-stop mechanism be so arranged, but various other changes may be made in its coordination and still involve the features of novelty as hereinafter claimed as my invention.

While the particular embodiments shown in the accompanying drawings, embody locking means such as hexagonal faced clutch members, particular angles of bearing surfaces or locking surfaces, such as on the floating ring and the counterbore holes of the locking means for back-rolling, snap ball-pressed holding means for shifter-rod, and otherwise, it will be understood that with the variations of the adaptation of my invention these features will be particularly determined, and spring pressures will be adjusted to suit the required conditions of any particular case where my invention is applied.

Many variations may be made in the designing or the embodiment of these inventions with any particular form of transmission, while their particular efficacy resides in the combination of these inventions with what is now generally known as a standard gear shift system, and therefore its coordination therewith has been fully illustrated and described. Modifications of the invention may be readily made to suit any variations of the standard parts of the transmission mechanism, the embodiment in two housings as illustrated has its advantages, but the entire interconnected structure may be built into one housing. Features of the invention may also be separately embodied or arranged, and variations may be made in the interconnection and interlocking and automatic features of functioning or control, without departing from my invention.

What I claim and desire to secure by Letters Patent is:

1. In an automobile a reverse car movement locking and braking mechanism including rollers, a cam faced annular member and a cylindrical faced member both adapted to effect locking engagement with the rollers, one of said members being non-rotative, means comprising radially shifting parts for differential relative rotation of one of said two annular members at all times during rotation of the shaft, whereby the rollers may at all times be set for automatic locking of rotation in one direction and may be automatically released independent of friction to permit rotation in both directions.

2. In an automobile a reverse car movement locking and braking mechanism including rollers, a cam faced annular member and a cylindrical faced annular member both adapted to engage said rollers, one of said members being non-rotative, means having radial movement, for differential relative rotation of one of said two annular members at all times during rotation of the shaft, whereby the rollers may at all times be set for automatic locking of rotation in one direction and may be automatically released independent of wear to permit rotation in both directions.

3. A back-rolling lock mechanism for power driven vehicles having locking rollers, a cam ring, a cooperating member having a cylindrical contact surface for locking engagement with said rollers and said cam ring, a setting means to shift the cam ring into locking position and to release it to permit movement to out-of-locking position, a member to support said setting means and having abutments adapted to engage the locking rollers to hold them out-of-locking position, and an actuating part supported to automatically cause said setting means to throw the lock into functioning position.

4. A back-roll-stop for a power driven vehicle or automobile having two concentric members and a plurality of intermediate rollers, one of said members engaging the rollers with a cylindrical surface and the other having a plurality of cam faces adapted in one position of the member to lock the rollers on the cylindrical surface, cooperating abutments limiting the circular movement of the rollers, and means self-adjusting for friction or wear for shifting the cam faced member relative to the abutments into functioning position, said means being adapted for operation to permit said cam faced member to shift relative to the abutments into out-of-functioning position.

5. A back-roll-stop according to claim 4, having means for shifting of the cam faced member relative to the abutments voluntarily out-of-functioning position and automatically into functioning position.

6. A back-roll-stop according to claim 4, having means to shift the cam faced member relatively to the abutments by locking and releasing devices actuated by a member effecting direct pressure to lock and by the release of said pressure to unlock and operating independent of friction or wear.

7. A back-roll-stop according to claim 4, having means self-adjusting for wear to shift and lock the cam faced member into functioning position automatically.

8. A back-roll-stop according to claim 4, including means for shifting the cam faced member relatively to the abutments having one or more radially inward moving elements, and means to force said elements radially inward to lock the cam member into its functioning position.

9. A roll-back-stop for power driven vehicles having two concentric members and a plurality of intermediate rollers, one of said members engaging the rollers with a cylindrical surface and the other having a plurality of cam faces adapted in one position of the member to lock the rollers on the cylindrical surface, cooperating abutments limiting the circular movement of the rollers, radially movable elements adapted to shift said abutments relative to the cam faced member, a floating member to force said radially moving elements for setting the cooperating abutments relative to the cam faced member, means acting upon the setting of the transmission into reverse position for releasing said radially moving locking elements to free the cam member, and spring means for thereafter automatically shifting said floating ring to relock the cam member into its functioning position.

10. In an automobile transmission, means permitting free rotation in both directions of a drive shaft, a relatively shifting member, a relatively moving rotative member, a coordinated locking member to prevent rotation in one direction by said relatively shifting member and said relatively moving rotative member cooperating to wedge roller or ball-locking means with a fixed non-rotative member, an encircling non-rotative member, said relatively moving rotative member having control means for slight angular disposition whereby in one position free rotation in both directions is permitted, and in another position automatic locking is caused in one direction.

11. In an automobile transmission, a coordinated locking member to prevent rotation in reverse direction, relatively shifting means and a relatively moving rotative member, said means and member cooperating to force all locking means into a fixed non-rotative member, an encircling non-rotative member, said relatively moving rotative member having control means for slight angular disposition, whereby in one position free rotation in both directions is permitted and in other position automatic locking is caused on reverse movement of the vehicle.

12. In an automobile transmission a reverse car movement locking or braking mechanism including on the driven shaft a polygonal faced hub, radially superposed rollers, and a peripheral non-rotative ring bearing, means for differential relative rotation of the polygonal faced hub at all times during rotation of the shaft, whereby the polygonal hub, rollers and fixed ring may be at all times set for automatic locking of rotation in one direction, or may be released to permit rotation in both directions at all times.

13. In an automobile transmission, a reverse car-rolling locking mechanism comprising a polygonal faced hub associated with the driven shaft, a bearing therefor permitting a differential rotation with respect to said shaft, and means for holding the same against relative rotation therewith, radially superposed rollers and an outer fixed cylindrical braking ring, whereby a predetermined relative rotary movement of the polygonal faced hub is controlled.

14. In an automobile transmission a reverse car-rolling locking mechanism comprising a polygonal faced hub on the driven shaft, a bearing therefor permitting a differential rotation on said shaft and means for holding the same against longitudinal motion, radially superposed rollers and an outer fixed cylindrical braking ring, an operating coupling associated therewith rotating with the driven shaft and cooperating means between the coupling and the polygonal hub whereby a predetermined longitudinal movement of the coupling on the driven shaft controls the differential rotary movement of the polygonal hub.

15. A back-rolling lock mechanism having a driven power shaft comprising a stationary torque-resisting ring having a cylindrical locking surface, a series of rollers engaging said surface, a polygonal faced locking cam member with cam faces for engaging said rollers, means of support for said cam member on said driven shaft permitting a slight rotary movement with respect thereto, means for automatically locking said cam member rigidly with respect to said power shaft and voluntary means for instantly freeing it to permit a slight relative rotary movement and positively releasing said back roll locking.

16. A back-rolling lock mechanism having a driven shaft a stationary locking ring anchored to a fixed part of an automobile or the like and having a cylindrical inner face, rollers engaging said inner face, a polygonal cam faced member engaging said rollers radially inward of said fixed member face, abutments for said rollers connected with said driven shaft, a cooperating support between said driven shaft and said polygonal faced cam permitting differential rotary movement thereof with respect to the abutments, and means for voluntarily freeing said polygonal faced cam member from the driven shaft and for automatically causing it to be instantly locked rigidly with respect to the driven shaft in a position causing the functioning of the back-rolling lock mechanism.

17. Back-rolling locking mechanism comprising a plurality of locking rollers, a fixed cylindrical bearing, a cooperating multi-cam faced member, a driven shaft having fixedly-held abutments positioned between said locking rollers and having a slight rotary differential movement with respect to the multi-cam faced locking member, interconnections between said driven shaft member and a rigidly associated part of the cam faced member cooperating therewith, a floating member voluntarily actuated to release the interconnections between said cam member and said driven shaft, and a spring adapted to positively force said floating member and thereby the cam member into a fixed position with respect to the driven shaft for functioning of the back roll locking.

18. Back-rolling lock mechanism of the character described, having locking rollers and intermediate abutments, a spring on one side of each roller cooperating with one of said abutments to force a roller toward an opposite abutment, a cam-ring differentially movable with respect to the abutments, a separate locking means to hold said cam-ring in one position with respect to the abutments including a plurality of radially movable balls, means to guide said balls, a floating collar having a tapered bearing surface to engage and adapted to move said balls radially in said guide means into engagement with a cooperating counterbore adjacent each ball in one of the associated parts, each counterbore having tapered sides of a predetermined degree for cooperation with the tapered surface on the floating ring, and a spring member actuating said floating ring, so constructed and arranged whereby said spring member causes a predetermined pressure on the floating ring in one direction for positive locking of said balls.

LINDSAY H. BROWNE.